United States Patent
Wilhelm

[11] Patent Number: 5,460,789
[45] Date of Patent: Oct. 24, 1995

[54] APPARATUS FOR PURIFYING POLLUTANT-CONTAINING OUTGOING AIR FROM INDUSTRIAL INSTALLATIONS BY REGENERATIVE AFTERBURNING

[75] Inventor: Friedrich Wilhelm, Gärtringen, Germany

[73] Assignee: Eisenmann Maschinenbau KG, Böblingen, Germany

[21] Appl. No.: 248,131

[22] Filed: May 24, 1994

Related U.S. Application Data

[63] Continuation-in-part of Ser. No. 991,813, Dec. 17, 1992, abandoned.

[30] Foreign Application Priority Data

Dec. 20, 1991 [DE] Germany ............... 41 42 136.1

[51] Int. Cl.[6] ............... F01N 3/10; B01D 53/36; F23D 14/00
[52] U.S. Cl. ............... 422/173; 422/174; 422/175; 422/177; 422/178; 422/182; 431/5; 431/7; 431/170; 110/210; 110/211; 110/212; 110/204
[58] Field of Search ............... 422/169, 178, 422/174, 171, 175, 173, 182, 177; 110/203, 204, 210, 211, 212; 431/5, 7, 170; 432/181, 182

[56] References Cited

U.S. PATENT DOCUMENTS

| | | |
|---|---|---|
| 3,172,251 | 3/1965 | Johnson ............... 422/175 |
| 3,914,088 | 10/1975 | Huyck ............... 431/5 |
| 3,997,294 | 12/1976 | Kritzler ............... 422/175 |
| 4,650,414 | 3/1987 | Grenfell ............... 431/5 |
| 4,678,643 | 7/1987 | Fetzer ............... 422/175 |
| 4,850,862 | 7/1989 | Bjerklie ............... 432/182 |
| 4,867,949 | 9/1989 | Betz ............... 422/174 |
| 5,016,547 | 5/1991 | Thomason ............... 422/175 |
| 5,024,817 | 6/1991 | Mattison ............... 431/5 |
| 5,163,829 | 11/1992 | Wildenberg ............... 431/5 |

FOREIGN PATENT DOCUMENTS

| 0133704 | 1/1979 | Germany ............... 110/203 |
|---|---|---|

*Primary Examiner*—Robert J. Warden
*Assistant Examiner*—Hien Tran
*Attorney, Agent, or Firm*—Anderson Kill Olick & Oshinsky

[57] ABSTRACT

An apparatus for purifying a pollutant-containing outgoing air from the industrial installations has a heat exchanging bed, which has a predetermined thickness, consist of a suitable, preferably mineral, material, and is located in the interior of a shaft-like reactor housing. During the purifying operation, the pollutant-containing air flows through the heat exchanging bed into a combustion chamber, and heated purified air flows from the combustion chamber through the heat exchanging bed in opposite direction, giving up its heat to the heat exchanging bed and thereby being cooled down. The pollutants contained in the pollutant-containing air are burned in the heat exchanging bed and, if needed, in the combustion chamber.

4 Claims, 2 Drawing Sheets

5,460,789

APPARATUS FOR PURIFYING POLLUTANT-CONTAINING OUTGOING AIR FROM INDUSTRIAL INSTALLATIONS BY REGENERATIVE AFTERBURNING

RELATED APPLICATION

This is a continuation-in-part of application Ser. No. 07/991,813, filed Dec. 17, 1992, for "An Apparatus For Purifying Pollutant-Containing Outgoing Air From Industrial Installations By Regenerative Afterburning", now abandoned.

BACKGROUND OF THE INVENTION

The invention relates to an apparatus for purifying a pollutant-containing outgoing air from industrial installations by regenerative afterburning, which apparatus includes a shaft-like reactor housing, a heat exchanging bed located in the housing interior and occupying a portion of the interior height, and inlet and outlet connection pipes supported in the wall of the reactor housing and through which, respectively, a pollutant-containing outgoing air from the industrial installations flows into the housing interior and a purified air flows out of the housing interior.

The free space beneath the heat exchanging bed serves for inflow of the pollutant-containing air and outflow of the purified air, and the space above the heat exchanging bed forms a combustion chamber which, at the same time, enables flow of the purified air through the heat exchanging bed to the outlet connection pipe.

The above-described apparatuses have been known for a long time and in different variations, see, e.g., DE-OS 38 11 598 and DE-OS 38 21 126 of the Applicant herein. The drawback of these apparatuses consists in their relatively large constructional costs associated with providing a necessary bracing for the heat exchanging bed.

SUMMARY OF THE INVENTION

The main object of the invention is providing a new combustion system for a pollutant-containing air based on a special discharge process and which, in association with a relatively simple and functionally reliable, due to its constructional design, apparatus, can be universally used with both large and small industrial installations.

This and other objects of the invention, which will become apparent thereafter are achieved by providing an apparatus of the above-mentioned type in which the heat exchanging bed is supported on a plane grate or perforated bottom plate and, in the free space beneath the bottom plate, there is provided a collection chamber for the purified air. The collection chamber continuously moves along the bottom plate, is approximately half-covered by the bottom plate, and at its edges is sealed against the bottom plate. The collection chamber is connected with the purified air outlet connection pipe by a connecting conduit. The collection chamber is further connected, viewed in the movement direction, with a scavenging air chamber. A purified air return conduit and a suction ventilator arranged therein connect the scavening air chamber to the pollutant-containing air inlet connection pipe. The scavenging air chamber and the purified air collection chamber, which are arranged adjacent to each other in the movement direction, have a combined surface area that is about half of the surface area of the bottom plate.

The objects and features of the present invention will become more apparent and the invention itself will be best understood from the following detailed description of the preferred embodiment when read with reference to the accompanying drawings.

DETAILED DESCRIPTION OF THE PREFERRED EMBODIMENT

Figure 1:
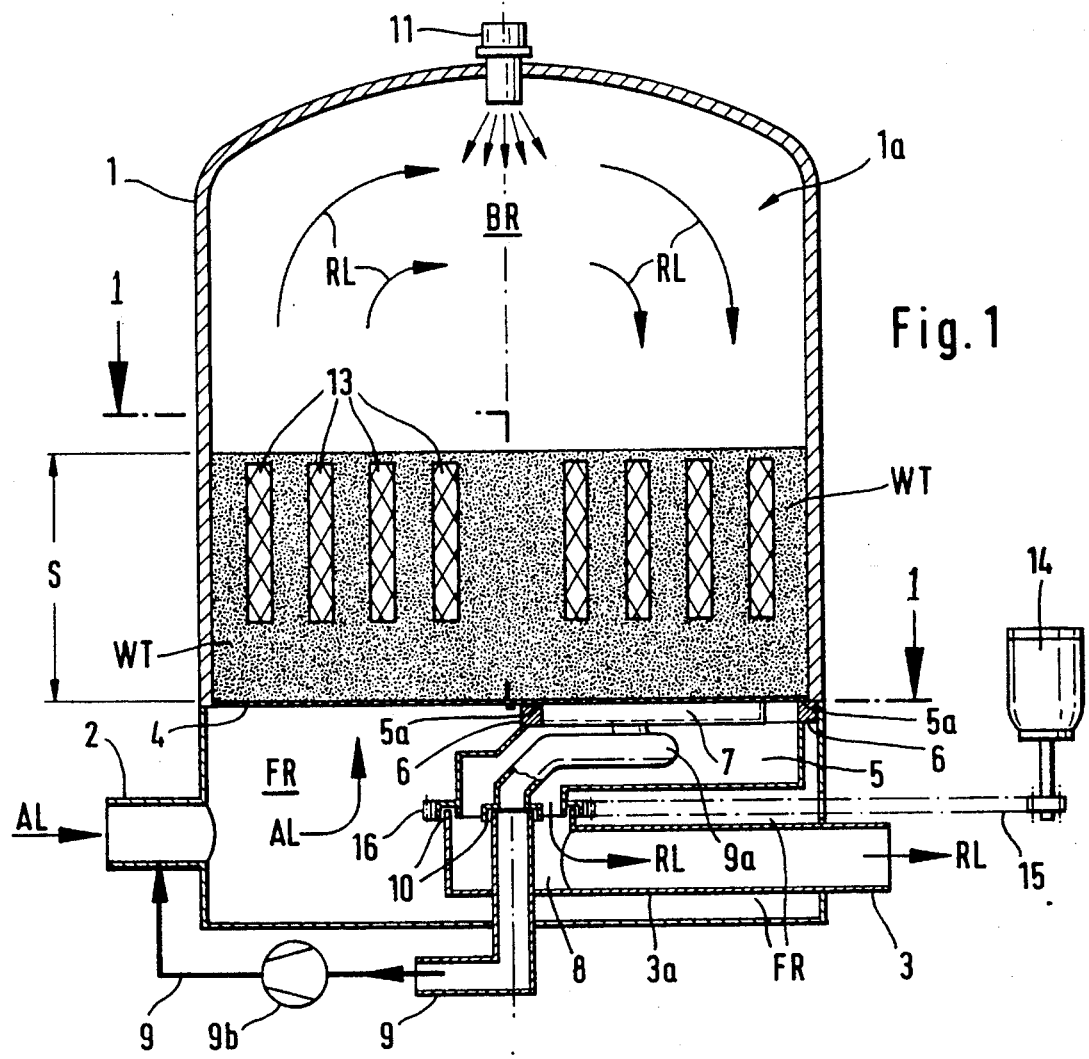
FIG. 1 shows a longitudinal cross-sectional view of an apparatus according to the invention along line 2—2 in FIG. 2.
Figure 2:
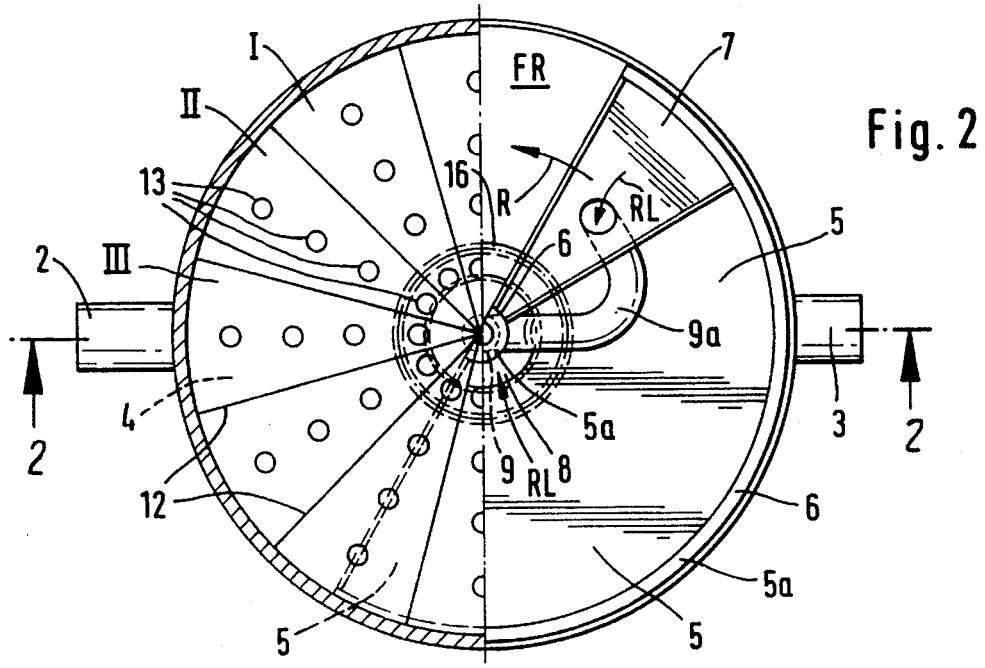
FIG. 2 shows a top partially cross-sectional view of the apparatus according to the invention along line 1—1 in FIG. 1.

An apparatus according to the invention and shown in FIGS. 1 and 2 includes a shaft-like reactor housing 1 and a heat exchanging bed, which is arranged approximately in the middle region of the housing interior. The heat exchanging bed "WT" has a thickness "S" and is formed of a suitable mineral material. Two connection pipes 2 and 3 are secured in the wall of the reactor housing for enabling flow into and from the housing, respectively, of a pollutant-containing air "AL" and a purified air "RL" after burning. The basic principle of operation of such an apparatus consists in that the free space "FR" beneath the heat exchanging bed serves as for inflow of the pollutant-containing air "AL" so for outflow of the purified air "RL", and the reactor housing region "BR" above the heat exchanging bed "WT" is formed as combustion chamber, which serves, at the same time for returning of the purified air "RL" through the heat exchanging bed "WT" to the outlet connection pipe 3 for the purified air.

In a special embodiment of the apparatus, it is envisaged that the heat exchanging bed "WT" rests on a plane grate or perforated bottom plate 4. In the free space "FR" beneath to bottom plate 4, there is provided a collection chamber 5, which continuously moves along the bottom plate 4 and is sealed, at its edges 5a, against the bottom plate 4 with seals 6. A connecting conduit 3a connects the collection chamber 5 with the purified air outlet connection pipe 3.

Figure 3:
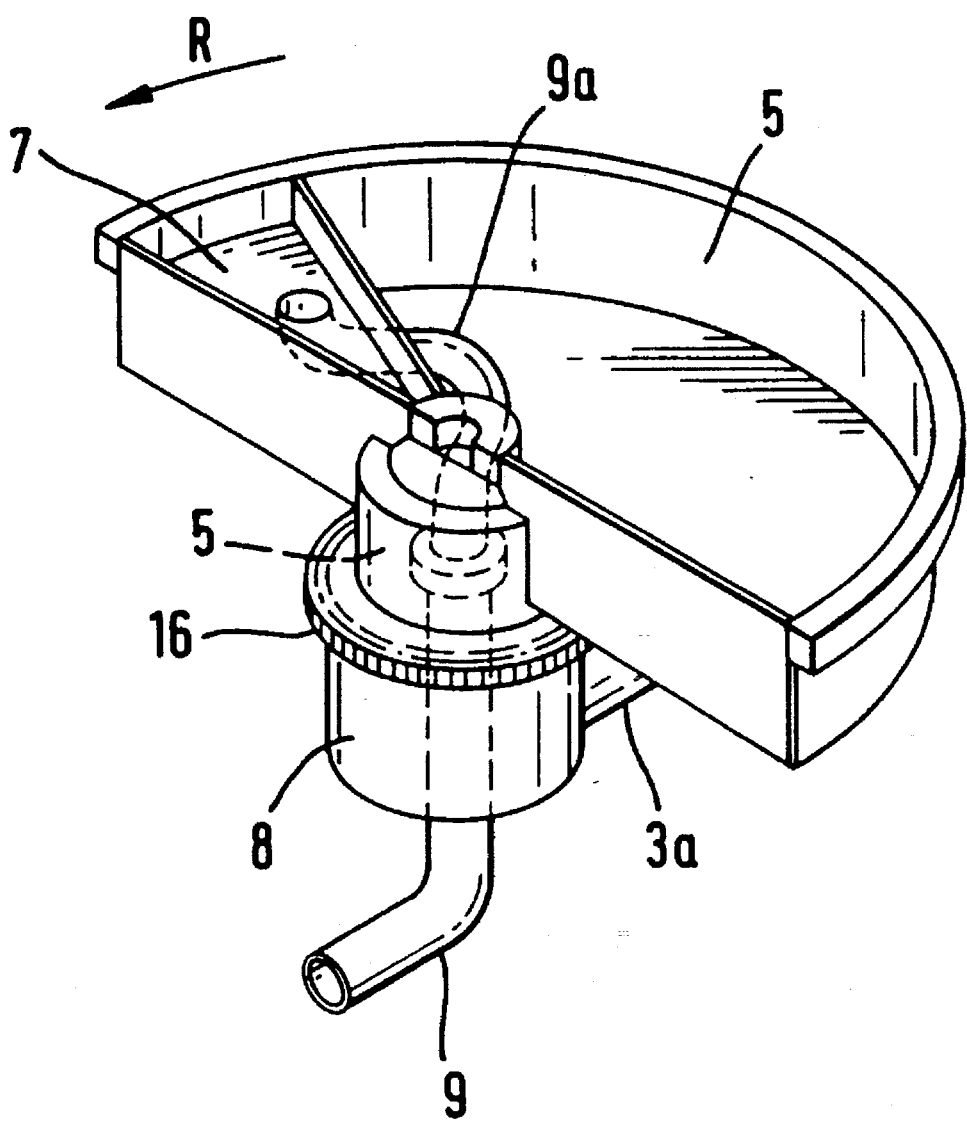
FIG. 3 shows a partial perspective view of the apparatus, according to the invention, illustrating positions of the air collection chamber and the scavenging air chamber.

In order that, during operation of the apparatus, the purified, i.e., pollutant-free air "RL" remains in the outlet connection pipe for a while, there is provided, upstream of the collection chamber 5 in the movement direction "R" a scavenging air chamber 7, which constructively forms a part of the collection chamber, with the upper surfaces of both chambers being located in the same plane, as shown in FIGS. 1 and 3. The scavenging air chamber 7 is connected to the outgoing air inlet connection pipe 2 via a return conduit 9, 9a for the purified air. A suction ventilator 9b is located inside the return conduit 9 for suctioning of the purified air. The scavenging air chamber 7 and the collecting chamber 5 have, as shown in FIGS. 2 and 3, a combined surface area that is about half of the bottom plate 4.

The described reactor housing 1 may have a rectangular cross-section, however, it is advantageous when, as it is shown in the drawings, the reactor housing 1 along with the grate or perforated bottom plate 4, has a circular cross-section, the collection chamber 5 and the scavenging air chamber 7 are formed as sectors, and both are motor-driven about a common central intermediate chamber 8, with the scavenging air chamber 7 being located upstream of the purified air collection chamber 5, as shown by arrow R.

With this construction, the purified air return conduit 9, 9a from the scavenging air chamber is formed of a stationary pipe 9 and a displaceable pipe member 9a. The pipe 9 is at least partially concentric with the central intermediate chamber 8, and the pipe member 9a extends into the continuously displaceable purified air collection chamber 5 and is connected to the scavenging air chamber 7. The collection chamber 5, the scavenging air chamber 7, and the pipe member 9a rotate together by 360°, as shown in FIG. 2. Labyrinth seals 10 are provided in transition regions between stationary elements, such as the intermediate chamber 8 and the pipe 9 and displaceable elements, such as the displaceable pipe member 9a and collection chamber 5.

In the apparatus according to the present invention, the heat exchanging bed "WT" is divided into a plurality of separate sectors I, II, as shown in FIG. 2, with separating walls 12 made of a high heat-resistant material. At least one supplementary burner 11 is provided in the combustion chamber "BR" above the head exchanging bed "WT". The combustion chamber "BR" may also include a baffle plate (not shown) for returning the purified air to the heat exchanging bed "WT".

Instead of the above described supplementary burner, alternatively, electrical heating elements 13 may be provided inside the heat exchanging bed, which, if needed, can be located inside the sectors defined between separating walls 12.

The purified air collection chamber 5, the scavenging air chamber 7, and the displacement pipe member 9a are rotated together by an electric motor 14 through a chain or belt drive 15. The chain or belt of the drive 15 engages a flange 16 of the collection chamber 5, as shown in FIG. 1.

The apparatus according to the invention, which is shown in the drawings and was described above, is used for effecting a process of purifying of outgoing gases, which includes heating of the heat exchanging bed "WT", which has a predetermined thickness "S" and is formed of a suitable, preferably, mineral material, by burning the pollutants that are contained in the industrial outgoing air "AL". The pollutant-containing air flows through the heat exchanging bed in one direction, and the warm purified air, which was purified by burning of the pollutants, flows through the heat exchanging bed in opposite directions. The purified air again heats the heat exchanging bed and is thereby cooled down, and is then collected in the purified air collection chamber 5 and is let off, e.g., through a chimney or directly into the air. A portion of the purified air accumulating in the scavenging air chamber 7 is aspirated by a suction ventilator 9b located in the conduit 9, and is returned, through the return conduit 9, to the outgoing air inlet connection pipe 2.

However, before purifying of the pollutant-containing air can proceed, the heat exchanging bed should be heated to about 650°–850° C., which is effected by the supplementary burner 11. The gases, generated as a result of operation of the supplementary burner 11, are let off through the rotating purified air collection chamber 5. The generated gases flow through the heat exchanging bed and heat the same. The heating can also be effected with electrical heating elements located inside the heat exchanging bed "WT". These elements can, e.g., be arranged inside the sectors defined between separating walls 12. When the predetermined temperature of the heat exchanging bed is achieved, the purification of the pollutant-containing air begins. The pollutant-containing air is supplied into the free space "FR" beneath the heat exchanging bed and flows into the heat exchanging bed "WT" through an area not covered by the rotating sectors 5 and 7. There, the pollutant-containing air is heated to the ignition temperature of the pollutants contained therein, and the pollutants are burned. Thereby, the temperature of the heat exchanging bed is again raised and reaches approximately 650°–850° C. If the content of the pollutants in the pollutant-containing air is not reduced to an acceptable level, the supplementary burner 11 should supply the lacking energy. Generally, the thickness "S" of the heat exchanging bed "WT" and dwell time in the combustion chamber "BR", along with the reaction temperature, are so selected that a complete oxidation of the pollutants in the pollutant-containing air "AL" is assured. The heated combustion gases from the combustion chamber "BR" flow in the reverse direction through that portion of the heat exchanging bed "WT" which is located directly above the displaceable sectors of scavenging air chamber 7 and the purified air collection chamber 5. The head exchanging bed material is thereby heated up and the purified gas correspondingly cools down. The heat exchanging bed, thus, has double function, namely, to give up heat in regular cycles corresponding to rotation of chambers 5 and 7, to the incoming pollutant-containing air and to absorb heat contained in the heated combustion gases for the following pollutant burning cycle. The thickness "S" of the heat exchanging bed is also so selected that the difference of the temperatures at the inlet of the pollutant-containing air and the outlet of the purified gas can be kept as small as possible.

Lastly, the whole system should be so optimized that the fan power, which is necessary for overcoming the flow resistance of the thickness "S" of the heat exchanging bed "WT", is economically comparable with the retrieved energy. The apparatus is so formed that it can operate with a reverse flow of the pollutant-containing air and the purified air.

While the present invention has been shown and described with reference to a preferred embodiment, various modification thereof will be apparent to those skilled in the art and, therefore, it is not intended that the invention be limited to the disclosed embodiment and/or to the details thereof, and departures can be made therefrom, within the spirit and scope of the invention as defined in the appended claims.

What is claimed is:

1. An apparatus for purifying a pollutant-containing outgoing air from industrial installations by regenerative afterburning, said apparatus comprising:

a shaft reactor housing having a pre-determined height;

a heat exchanging bed located in a central portion of the housing and occupying a portion of the predetermined housing height, said heat exchanging bed defining lower and upper portions of said reactor housing, the lower portion serving for inflow of pollutant-containing air and outflow of purified air, and the upper portion serving as a combustion chamber;

inlet means communicating with the lower portion through which the pollutant-containing air flows into said lower portion;

outlet means communicating with the lower portion through which the purified air is exhausted;

a perforated bottom plate located in said reactor housing at a predetermined height for supporting said heat exchanging bed;

a purified air collection chamber located beneath said bottom plate in the lower portion, said collection chamber being continuously displaceable along the circumference of said bottom plate;

seal means for sealing edges of said collection chamber with respect to said bottom plate;

conduit means connecting said collection chamber with said outlet means;

a scavenging air chamber arranged upstream of said collection chamber in a movement direction of said collection chamber, said scavenging air chamber, said collection chamber, having a combined surface which is about half of said bottom plate; and return conduit means for communicating said scavenging air chamber with said inlet means, said return conduit means including suction means which provide for flow of purified air from said scavenging chamber through said return conduit means to said inlet means.

2. An apparatus as set forth in claim 1, wherein said suction means includes a suction ventilator.

3. An apparatus as set forth in claim 1, wherein:

said reactor housing further includes a central intermediate chamber located in said lower portion of said reactor housing and arranged about an axis thereof;

said reactor housing and said bottom plate have a circular cross-section;

said collection and scavenging air chambers are formed as sectors and both rotate about said central intermediate chamber; and said return means comprises a stationary portion and a displaceable portion, said stationary portion being partially concentrically arranged with said central intermediate chamber and said displaceable portion extending into said collection chamber.

4. An apparatus as set forth in claim 1, further comprising a plurality of separating plates located inside said heat exchanging bed and defining a plurality of sectors, and a plurality of electrical elements located inside each of said plurality of sectors defined between respective separating plates.

* * * * *